May 21, 1957 — J. BASILE — 2,792,867
ANTI-SKID CHAIN FOR AUTOMOTIVE VEHICLE TIRES
Filed Nov. 17, 1953
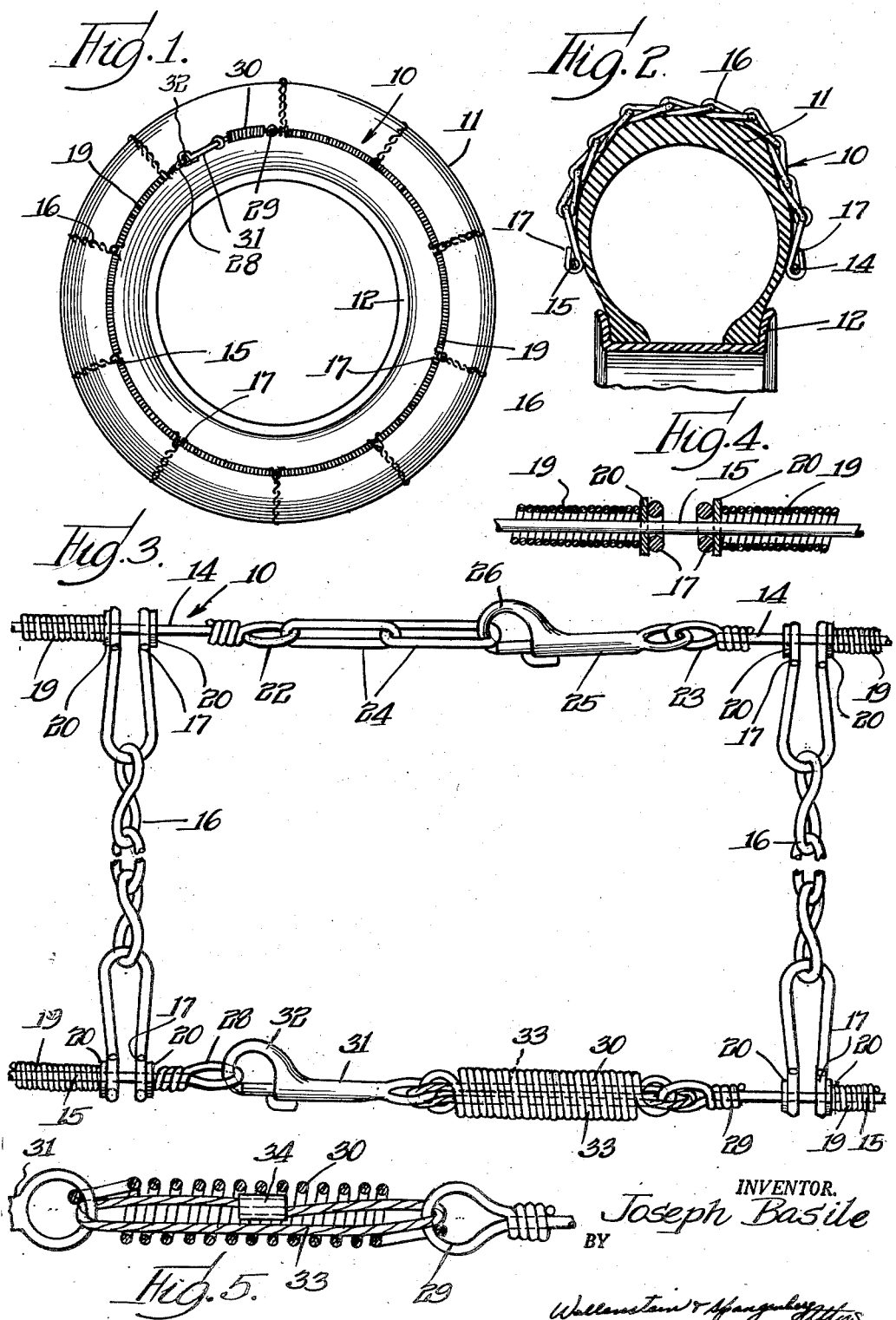
INVENTOR.
Joseph Basile
BY
Wallenstein & Spangenberg, Attys.

United States Patent Office 2,792,867
Patented May 21, 1957

2,792,867

ANTI-SKID CHAIN FOR AUTOMOTIVE VEHICLE TIRES

Joseph Basile, Chicago, Ill.

Application November 17, 1953, Serial No. 392,588

4 Claims. (Cl. 152—219)

This invention relates to anti-skid chains for automotive vehicle tires.

The principal object of this invention is to provide an improved anti-skid chain for automotive vehicles which is simple to apply and remove, which is adjustable to fit different sized tires, which eliminates pounding of pavements and reduces wear resulting therefrom, which snugly fits the tire but which separates slightly therefrom at high speeds to prevent burning of the tire, which prevents slapping of fenders and the like, which will not inadvertently slip off of the tire, and which may be inexpensively manufactured.

Briefly, the anti-skid chain of this invention includes a first stiff wire preformed into a substantially circular configuration and adapted to be located on one side of the tire, a second stiff wire preformed into a substantially circular configuration and adapted to be located on the other side of the tire, and a plurality of chains connected at their ends to the two stiff wires and adapted to overlie the tread of the tire. A plurality of spacers are located on the two stiff wires and are interposed between the plurality of chains for spacing the chains along the two stiff wires. These spacers are preferably in the form of closely wound coil springs to provide a slightly resilient spacing means for the chains and yet limit the amount of movement of the chains along the two stiff wires.

Means including a snap hook are provided for detachably connecting together the ends of the first stiff wire, and means including a snap hook are also provided for detachably connecting together the ends of the second stiff wire. In this way the anti-skid chain of this invention with its stiff wires and hook means may be readily applied to and removed from the tire.

The ends of the first stiff wire are provided with eyes, a plurality of links are secured to one of the eyes, and a snap hook is secured to the other eye and detachably receives one of the links for adjustably and detachably securing together the ends of the first stiff wire. This makes the anti-skid chain of this invention adjustable to fit different sized tires.

The ends of the second stiff wire are also provided with eyes. A coil spring is secured at one end to one of the eyes and a snap-hook is secured to the other end of the coil spring for detachably receiving the other eye for detachably and resiliently securing together the ends of the second stiff wire. This makes the chains fit snugly against the tire and yet allows the chains to separate from the tire at high speed to prevent burning of the tire. A cable connects together the first eye and the snap hook to limit the extent of stretching of the coil spring. This effectively prevents pounding of pavements and reduces wear resulting therefrom and also prevents slapping of fenders and the like. It also aids in preventing excessive slipping of the chains with respect to the tire which might result in the anti-skid chain slipping off the tire.

Further objects of this invention reside in the details of construction of the anti-skid chain and in the cooperative relationships between the component parts thereof.

Other objects and advantages of this invention will become apparent to those skilled in the art upon reference to the accompanying specification, claims and drawing, in which:

Fig. 1 is an elevational view illustrating the anti-skid chain of this invention applied to an automotive vehicle tire;

Fig. 2 is a sectional view through a portion of an automotive vehicle tire illustrating the anti-skid chain of this invention applied thereto;

Fig. 3 is a partial view of the anti-skid chain;

Fig. 4 is an enlarged sectional view illustrating the manner in which the chains are carried by the stiff wires and spaced apart;

Fig. 5 is a sectional view through the coil spring associated with one of the stiff wires.

The anti-skid chain of this invention is generally designated at 10 and is shown in Figs. 1 and 2 applied to an automotive vehicle tire 11 carried by a suitable rim 12. The anti-skid chain 10 includes a first stiff wire 14 and a second stiff wire 15. These stiff wires are preformed and heat treated into a substantially circular configuration and are adapted to be located respectively on opposite sides of the tire 11 as illustrated in Figs. 1 and 2. A plurality of chains 16 are connected at their ends by suitable eyes 17 to the stiff wires 14 and 15 and these chains are adapted to overlie the tread of the tire 11. A plurality of spacers 19 are located on the two stiff wires 14 and 15 between the eyes 17 of the chains 16 for spacing the chains along the two stiff wires. These spacers 19 are preferably in the form of closely wound coil springs and engage the eyes 17 of the chains 16 through washers 20 to provide a slightly resilient spacing means for the chains and yet limit the amount of movement of the chains along the two stiff wires.

The ends of the preformed stiff wire 14 are provided with eyes 22 and 23. A plurality of links 24 are secured to the eye 22, and a snap hook 25 having a hook portion 26 is secured to the eye 23. The hook portion 26 of the snap hook 25 is adapted to be received in the eye 22 or one or the other of the links 24 for adjustably and detachably securing together the ends of the stiff wire 14. This arrangement makes possible the adjustment of the anti-skid chain to fit different sized tires.

The ends of the other preformed stiff wire 15 are provided with eyes 28 and 29. A coil spring 30 is secured at one end to the eye 29, and a snap hook 31 having a hook portion 32 is secured to the other end of the coil spring 30. The hook portion 32 of the snap hook 31 is adapted to receive the eye 28 for detachably and resiliently securing together the ends of the stiff wire 15. In so doing, the spring 30 is stretched to cause the chains 16 to fit snugly against the tire and yet, allows the chains 16 to separate slightly from the tire as the tire is rotated at high speeds to prevent burning of the tire. A cable 33 extends through the eye 29 and the snap hook 31 and has its ends secured together by a suitable cable clamp 34 within the spring 30. This cable 33 connects together the eye 29 and the snap hook 31 and operates to limit the extent of stretching of the coil spring 30. This effectively prevents pounding of pavements and reduces wear resulting therefrom and also prevents slapping of fenders and the like. It also aids in preventing excessive slipping of the chains with respect to the tire which might result in the anti-skid chain slipping off of the tire.

In applying the anti-skid chain of this invention to the tire, the preformed stiff wire is first arranged on the inside of the tire and the snap hook 25 is connected to the eye 22 or one or the other of the links 24, depending upon the size of the tire, for connecting together the ends of the stiff wire 14. Because the wire 14 is stiff and preformed, this operation is readily and simply performed. The chains 16 are extended over the tread of the tire and then the snap hook 32 is connected to the eye 28 for securing together the ends of the preformed stiff wire 15. This operation may also be readily performed. In so doing, the spring 30 is stretched within the limits determined by the cable 33 to apply tension to the stiff wire 15 and to hold the chains 16 snugly against the tire. As the tire is rotated at reasonable speeds, the chains 16 are held against the tire but as the speed of rotation of the tire increases to a high value, the spring 30 will additionally stretch to allow the chains 16 to separate a slight amount from the tire. The extent of such slight separation is limited by the cable 33 which limits the extent of stretching of the spring 30. Because the spacers 19 are closely wound coil springs, a slight amount of movement of the chains 16 along the stiff wires 14 and 15 is permitted and at the same time, excessive movement is prevented. This effectively prevents the chains from positioning themselves to points wherein the anti-skid chain of this invention may inadvertently slip off the tire and the prevention of this excessive slipping of the chains is also aided by the spring 30 and the cable 33. The anti-skid chain may be simply and quickly removed from the tire merely by detaching the snap hooks 25 and 31.

While for purposes of illustration one form of this invention has been disclosed, other forms thereof may become apparent to those skilled in the art upon reference to this disclosure and, therefore, this invention is to be limited only by the scope of the appended claims.

I claim as my invention:

1. An anti-skid chain for automotive vehicle tires comprising a first stiff wire preformed into a substantially circular configuration and adapted to be located on one side of the tire, a second stiff wire preformed into a substantially circular configuration and adapted to be located on the other side of the tire, a plurality of chains pivotally and slidably connected at their ends to the two stiff wires and adapted to overlie the tread of the tire, a plurality of slightly resilient spacers slidably located on the two stiff wires and interposed and extending between successive chains for spacing the chains along the two stiff wires, means including a snap hook for detachably connecting together the ends of the first stiff wire, an eye formed on each end of the second stiff wire, a coil spring secured at one end to one of the eyes, a snap hook secured to the other end of the coil spring for detachably receiving the other eye for resiliently and detachably securing together the ends of the second stiff wire, and a cable connecting together said first eye and the snap hook to limit the extent of stretching of the coil spring.

2. An anti-skid chain for automotive vehicle tires comprising a first stiff wire preformed into a substantially circular configuration and adapted to be located on one side of the tire, a second stiff wire preformed into a substantially circular configuration and adapted to be located on the other side of the tire, a plurality of chains pivotally and slidably connected at their ends to the two stiff wires and adapted to overlie the tread of the tire, a plurality of spacers slidably located on the two stiff wires and interposed and extending between successive chains for spacing the chains along the two stiff wires, an eye formed on each end of the first stiff wire, a plurality of links secured to one of the eyes, a snap hook secured to the other eye and detachably receiving one of the links for adjustably and detachably securing together the ends of the first stiff wire, an eye formed on each end of the second stiff wire, a coil spring secured at one end to one of the eyes, a snap hook secured to the other end of the coil spring for detachably receiving the other eye for resiliently and detachably securing together the ends of the second stiff wire, and a cable connecting together said first eye and the snap hook to limit the extent of stretching of the coil spring.

3. An anti-skid chain for automotive vehicle tires comprising a first stiff wire preformed into a substantially circular configuration and adapted to be located on one side of the tire, a second stiff wire preformed into a substantially circular configuration and adapted to be located on the other side of the tire, a plurality of chains pivotally and slidably connected at their ends to the two stiff wires and adapted to overlie the tread of the tire, a plurality of slightly resilient spacers, each comprising a closely wound coil spring, slidably located on the two stiff wires and interposed and extending between successive chains for resiliently spacing the chains along the two stiff wires and limiting the amount of movement of the chains therealong, an eye formed on each end of the first stiff wire, a plurality of links secured to one of the eyes, a snap hook secured to the other eye and detachably receiving one of the links for adjustably and detachably securing together the ends of the first stiff wire, an eye formed on each end of the second stiff wire, a coil spring secured at one end to one of the eyes, a snap hook secured to the other end of the coil spring for detachably receiving the other eye for resiliently and detachably securing together the ends of the second stiff wire, and a cable connecting together said first eye and the snap hook to limit the extent of stretching of the coil spring.

4. In an anti-skid chain for automotive vehicle tires having a stiff wire preformed into a substantially circular configuration for carrying in spaced apart relation a plurality of chains, and an eye formed on each end of the stiff wire, the combination of a coil spring secured at one end to one of the eyes, a snap hook secured to the other end of the coil spring for detachably receiving the other eye, and a cable connecting together said first eye and the snap hook to limit the extent of stretching of the coil spring.

References Cited in the file of this patent

UNITED STATES PATENTS

| | | |
|---|---|---|
| 341,445 | Bristol | May 11, 1886 |
| 1,355,372 | Weston | Oct. 12, 1920 |
| 1,489,736 | Brundage | Apr. 8, 1924 |
| 2,420,758 | Owings | May 20, 1947 |
| 2,458,642 | Reynolds | Jan. 11, 1949 |
| 2,493,994 | Newman | Jan. 10, 1950 |